(12) United States Patent
Ochsenbein et al.

(10) Patent No.: US 11,523,235 B2
(45) Date of Patent: Dec. 6, 2022

(54) COVER PLATE FOR AN EARPIECE, EARPIECE AND METHOD OF PRODUCING EARPIECE

(71) Applicant: SONOVA AG, Staefa (CH)

(72) Inventors: Andre Ochsenbein, Wolfhausen (CH); Michael Takacs, Stäfa (CH); Gabriel Perez, Männedorf (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 17/161,542

(22) Filed: Jan. 28, 2021

(65) Prior Publication Data

US 2021/0243541 A1 Aug. 5, 2021

(30) Foreign Application Priority Data

Feb. 3, 2020 (EP) .................................... 20155132

(51) Int. Cl.
*H04R 25/00* (2006.01)
*B33Y 80/00* (2015.01)

(52) U.S. Cl.
CPC ......... *H04R 25/658* (2013.01); *H04R 25/609* (2019.05); *B33Y 80/00* (2014.12); *H04R 2225/025* (2013.01); *H04R 2225/51* (2013.01)

(58) Field of Classification Search
CPC .............. H04R 25/658; H04R 25/609; H04R 2225/025; H04R 2225/51; H04R 1/10–1091; B33Y 80/00
See application file for complete search history.

(56) References Cited

U.S. PATENT DOCUMENTS

| | | | |
|---|---|---|---|
| 2006/0120547 A1 | 6/2006 | Fletcher | |
| 2009/0094817 A1* | 4/2009 | Killion | H04R 25/402 381/313 |
| 2010/0158295 A1* | 6/2010 | Polinske | H01Q 1/243 343/866 |
| 2016/0183018 A1* | 6/2016 | Spearman | H04R 25/606 381/324 |
| 2018/0084351 A1* | 3/2018 | Polinske | H04R 25/554 |
| 2018/0227686 A1* | 8/2018 | Frei | H04R 25/658 |

FOREIGN PATENT DOCUMENTS

EP 3588980 1/2020

OTHER PUBLICATIONS

Extended European Search Report received in EP Application No. 20155132.2 dated Jul. 1, 2020.

* cited by examiner

*Primary Examiner* — Mark Fischer
(74) *Attorney, Agent, or Firm* — ALG Intellectual Property, LLC

(57) ABSTRACT

The present disclosure relates to a cover plate for covering a lateral opening of a shell of an earpiece configured to be worn at least partially within an ear canal, wherein the cover plate comprises a circumferential trench for receiving an antenna on a medial side of the cover plate, wherein the cover plate comprises a circumferential wall radially outward from the trench and adjacent the wall a surface for gluing the shell on.

18 Claims, 2 Drawing Sheets

COVER PLATE FOR AN EARPIECE, EARPIECE AND METHOD OF PRODUCING EARPIECE

RELATED APPLICATIONS

The present application claims priority to EP Patent Application No. EP 20155132.2, filed Feb. 3, 2020, the contents of which are hereby incorporated by reference in their entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
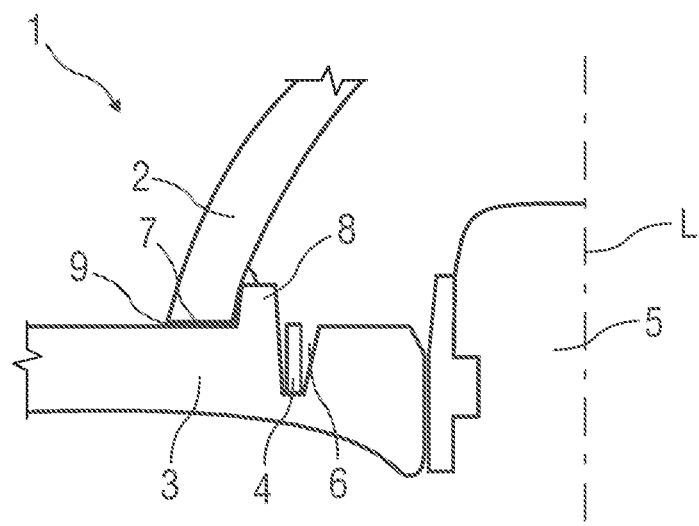
FIG. 1 is a schematic sectional view of a detail of an earpiece having a shell and a cover plate.

The present disclosure relates to a cover plate for covering a lateral opening of a shell of an earpiece configured to be worn at least partially within an ear canal. Moreover, the present disclosure relates to an earpiece and to a method of producing an earpiece.

Earpieces or hearing devices that are provided for being worn at least partially within an ear canal comprise a shell with an outwardly facing opening covered by a cover plate which is also referred to as a face plate. In-the-Ear hearing devices (ITE) are examples of such hearing devices comprising an earpiece. The shell may have a standardized shape or a customized shape (i.e. adapted to an individual shape of the ear canal of a user), wherein the housing or shell comprises an outer opening covered by a cover plate pointing out of the ear canal when the In-the-Ear hearing device is worn within the ear canal. For wireless applications, in particular in the 2.4 GHz ISM band (Industrial, Scientific, and Medical), In-the-Ear hearing devices can be equipped with a suitable antenna. The design of the antenna is restricted by the limited available space, the desired frequency band and the interaction of the electromagnetic radiation with the user's tissue.

The present disclosure provides an improved cover plate for an earpiece, suitable for wireless application, an earpiece having such a cover plate as well as an improved method of manufacturing such an earpiece.

According to the present disclosure, a cover plate is proposed for covering a lateral opening of a shell of an earpiece configured to be worn at least partially within an ear canal, wherein the cover plate comprises a circumferential trench for receiving an antenna on a medial side of the cover plate, wherein the cover plate comprises a circumferential wall radially outward from the trench and adjacent the wall a surface for gluing the shell on. In the context of the present disclosure a circumferential trench shall be understood as a trench which either completely runs around or which comprises one or more interruptions.

When gluing the shell onto the cover plate, the wall prevents adhesive from running into the trench. This way any changes of the position and/or form of the antenna which is already positioned there are prevented such that the position and/or form of the antenna is reproducible in all earpieces produced.

In an embodiment the circumferential wall directly adjoins the trench. The wall may in particular be positioned such that it uses as little space as possible and that it is not higher or broader than required, but that it prevents the adhesive from running down into the trench.

In an embodiment, the circumferential wall is integrally formed with the cover plate.

In an embodiment the wall protrudes by a height of 1 mm or less above the surface for gluing the shell on.

In an embodiment the trench is formed in the medial surface of the cover plate.

In an embodiment the cover plate is part of an earpiece configured to be worn at least partially within an ear canal, the earpiece further comprising a shell with a lateral opening covered by the cover plate, wherein a lateral end of the shell is glued at least on a medial surface of the cover plate outward from the wall.

In an embodiment the earpiece further comprises at least one internal component comprising a transmitter/receiver unit for wireless operation, in particular with an operational frequency from 2.4 GHz to 2.5 GHz, and an antenna arranged in the trench.

In an embodiment, the wall is positioned to directly adjoin the shell when the shell is glued on the cover plate. This way positioning the shell on the cover plate is facilitated.

In an embodiment a radially inwardly facing, circumferential recess is provided at the lateral end of the shell, the recess being designed such that the wall is at least partially received therein and that a remaining part of the lateral end of the shell is glued on the cover plate. This embodiment solves the problem that, in particular with very narrow ear canals, the shell may have to have such a small external diameter that it cannot readily be glued on radially outward from the wall. The recess remedies this problem.

In an embodiment, the antenna is configured as a dipole antenna.

In an embodiment, the antenna is configured as a conductive path on a flexible printed circuit board.

In an embodiment, the shell is made of titanium, plastic or an elastomer.

According to an aspect of the present disclosure a method of producing an earpiece is proposed, wherein at least one internal component is arranged on a medial side of the cover plate and an antenna is arranged in the trench, wherein a lateral end of the shell is glued at least upon a medial surface of the cover plate outwardly from the wall.

In an embodiment, subsequent to the gluing on of the shell, a projecting area of the cover plate is cut off along an outer edge of the shell.

In an embodiment, the shell is produced by 3D printing and the recess is formed in the shell during 3D printing or the recess is subsequently milled out of the shell.

In the following, the term "hearing device" is supposed to denominate all kinds of hearing devices configured to be at least partially worn within an ear canal, e.g. In-the-Ear hearing devices (ITE), In-the-Canal hearing devices (ITC), or Completely-In-The-Canal hearing devices (CIC).

In the following, the term "lateral" is supposed to refer to a direction pointing away from the eardrum when the hearing device is at least partially worn within the ear canal.

The term "medial" refers to a direction toward the eardrum when the hearing device is at least partially worn within the ear canal.

The present disclosure relates to an earpiece 1 or a hearing device provided for being worn at least partially within an ear canal, in particular an In-the-Ear hearing device (ITE), comprising a shell 2 provided for being worn at least partially within an ear canal and having a lateral opening covered by a cover plate 3 (faceplate).

FIG. 1 is a schematic view of a detail of an earpiece 1 or hearing device having a shell 2 and a cover plate 3.

The earpiece 1 or hearing device may further comprise a transmitter/receiver unit for wireless operation, in particular with an operational frequency in a band from 2.4 GHz to 2.5 GHz, and an antenna 4, in particular a dipole antenna. The antenna is integrated in the cover plate 3, in particular such that it follows a contour of a circumference of the cover plate 3 to maximize radiation yield.

In some embodiments the antenna 4 is arranged around internal components 5 of the earpiece 1 or hearing device, e.g. a battery 10 and an electronic subunit 11. The antenna 4 may have two arms with a gap between the ends of the arms, wherein the gap may, in some examples, have a width of 0.05 mm to 0.5 mm in order to optimize the performance of the antenna 4.

The antenna 4 may be configured as a conductive path on a flexible printed circuit board which is medially arranged in the cover plate 3 within a trench 6 circumferentially formed within the medial surface of the cover plate 3.

The shell 2 may for example be made of titanium, plastic or an elastomer and is glued upon the medial surface of the cover plate 3 using an adhesive such that all internal components 5 fit within the shell 2. The trench 6 is located in the cover plate 3 outwardly from all internal components 5.

A circumferential wall 8 is provided on the medial surface of the cover plate 3 on an outer side of the trench 6 facing radially away from a longitudinal axis L of the earpiece 1 or hearing device, e.g. directly adjacent the trench 6, wherein the circumferential wall 8 may for example be integrally formed with the cover plate 3. When gluing the shell 2 onto the cover plate 3, the wall 8 prevents adhesive 7 from running into the trench 6. This way any changes of the position and/or form of the antenna 4 which is already positioned there are prevented such that the position and/or form of the antenna 4 is reproducible in all earpieces 1 produced. The wall 8 may in particular be positioned such that it uses as little space as possible and that it is not higher or broader than required, but that it prevents the adhesive 7 from running down into the trench 6. For example the wall 8 may have a height of 1 mm or less. Tests have shown that a range between 0.2 mm and 1 mm is particularly advantageous. With lower walls, the adhesive is not reliably retained. A higher wall may be detrimental as it requires more space. Further, the wall 8 may be positioned to directly adjoin the shell 2 when the shell 2 is glued on the cover plate 3 thus facilitating the positioning of the shell 2 on the cover plate 3. Subsequent to the gluing on of the shell 2, a projecting area of the cover plate 3 may be cut off along an outer edge 9 of the shell 2 facing radially away from the longitudinal axis L.

Figure 2:
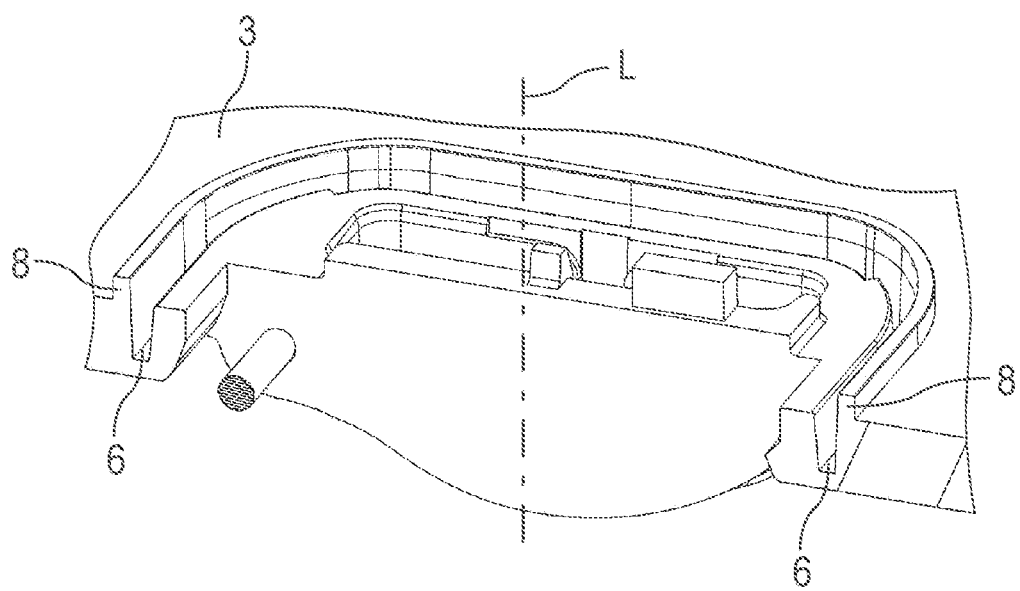
FIG. 2 is a schematic sectional view of the cover plate.

FIG. 2 is a further schematic view of the cover plate 3.

Figure 3:
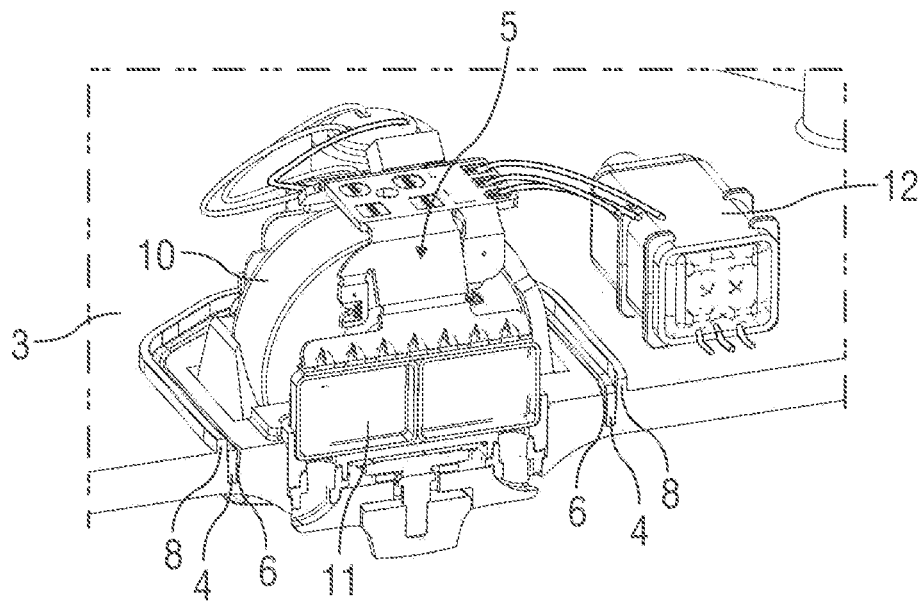
FIG. 3 is a schematic sectional view of the cover plate with internal components of the earpiece.

FIG. 3 is a schematic view of the cover plate 3 with internal components 5 of the earpiece 1 mounted thereon, e.g. a battery 10 and an electronic subunit 11, e.g. comprising a transmitter/receiver unit. A speaker 12 is connected to the electronic subunit 11 and loosely lies upon the area which is to be cut off around the cover plate 3 after the shell 2 has later been glued on. The speaker 12 may for example be arranged on the medial end of the shell 2 before the shell 2 is glued on.

Figure 4:
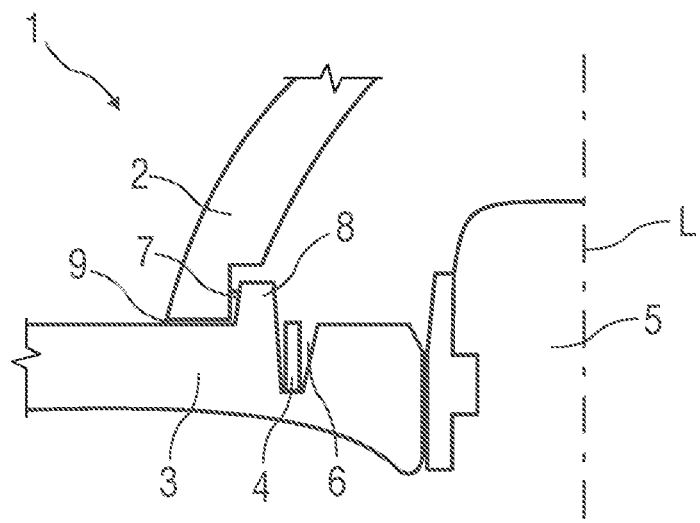
FIG. 4 is a schematic sectional view of a detail of a further embodiment of the earpiece having a shell and a cover plate.

FIG. 4 is a schematic view of a detail of a further embodiment of an earpiece 1 with a shell 2 and a cover plate 3.

The earpiece 1 or hearing device may further comprise a transmitter/receiver unit for wireless operation, in particular with an operational frequency in a band from 2.4 GHz to 2.5 GHz, and an antenna 4, in particular a dipole antenna. The antenna 4 is integrated in the cover plate 3, in particular such that it follows a contour of a circumference of the cover plate 3 to maximize radiation yield.

In some embodiments the antenna 4 is arranged around internal components 5 of the earpiece 1 or hearing device, e.g. a battery 10 and an electronic subunit 11. The antenna 4 may have two arms with a gap between the arms, wherein the gap may, in some examples, have a width of 0.1 mm to 5 mm in order to optimize the performance of the antenna 4.

The antenna 4 may be configured as a conductive path on a flexible printed circuit board which is medially arranged in the cover plate 3 within a trench 6 formed within the medial surface of the cover plate 3.

The shell 2 may for example be made of titanium, plastic or an elastomer and is glued upon the medial surface of the cover plate 3 using an adhesive such that all internal components 5 fit within the shell 2. The trench 6 is located in the cover plate 3 outwardly from all internal components 5.

A circumferential wall 8 is provided on the medial surface of the cover plate 3 on an outer side of the trench 6 facing radially away from a longitudinal axis L of the earpiece 1 or hearing device, e.g. directly adjacent the trench 6, wherein the circumferential wall 8 may for example be integrally formed with the cover plate 3. When gluing the shell 2 onto the cover plate 3, the wall 8 prevents adhesive 7 from running into the trench 6. This way any changes of the position and/or form of the antenna 4 which is already positioned there are prevented such that the position and/or form of the antenna 4 is reproducible in all earpieces 1 produced. The wall 8 may in particular be positioned such that it uses as little space as possible and that it is not higher or broader than required, but that it prevents the adhesive 7 from running down into the trench 6. For example the wall 8 may have a height of 1 mm or less. Further, the wall 8 may be positioned to directly adjoin the shell 2 when the shell 2 is glued on the cover plate 3 thus facilitating the positioning of the shell 2 on the cover plate 3. Subsequent to the gluing on of the shell 2, a projecting area of the cover plate 3 may be cut off along an outer edge 9 of the shell 2 facing radially away from the longitudinal axis L. In particular with narrow ear canals, it may occur that the shell 2 has to have such a small external diameter that it cannot readily be glued on radially outward from the wall 8. In order to remedy this, a circumferential recess 13 may be provided at the lateral end of the shell 2, the recess 13 radially facing toward the longitudinal axis L, the recess 13 being designed such that the wall 8 may be at least partially received therein and that a remaining part of the lateral end of the shell 2 may be glued onto the cover plate 3 anyway. The recess 13 may already be when 3D printing the shell 2. Alternatively, the recess 13 may subsequently be milled out of the shell 2.

LIST OF REFERENCES 1 ear piece
2 shell 3 cover plate
4 antenna
5 internal component
6 trench
7 adhesive
8 wall
9 outer edge
10 battery
11 electronic subunit
12 speaker
13 recess
L longitudinal axis

What is claimed is:

1. A cover plate for covering a lateral opening of a shell of an earpiece configured to be worn at least partially within an ear canal, wherein:
the cover plate comprises a circumferential trench for receiving an antenna on a medial side of the cover plate;
the cover plate comprises a circumferential wall radially outward from the circumferential trench, the circumferential wall fully surrounding the circumferential trench and configured to prevent glue from entering the circumferential trench; and
adjacent to the circumferential wall is a surface for gluing the shell on.

2. The cover plate according to claim 1, wherein the circumferential wall directly adjoins the circumferential trench.

3. The cover plate according to claim 1, wherein the circumferential wall is integrally formed with the cover plate.

4. The cover plate according to claim 1, wherein the circumferential wall protrudes by a height of 1 mm or less above the surface for gluing the shell on.

5. The cover plate according to claim 1, wherein the circumferential trench is formed in a medial surface of the cover plate.

6. An earpiece, configured to be worn at least partially within an ear canal, the earpiece comprising:
a cover plate comprising a circumferential trench for receiving an antenna on a medial side of the cover plate, wherein the cover plate comprises a circumferential wall radially outward from the circumferential trench, the circumferential wall fully surrounds the circumferential trench and is configured to prevent glue from entering the circumferential trench, and adjacent to the circumferential wall is a surface for gluing a shell on, and
the shell with a lateral opening covered by the cover plate, wherein a lateral end of the shell is glued at least on a medial surface of the cover plate outward from the circumferential wall.

7. The earpiece according to claim 6, further comprising at least one internal component comprising a transmitter/receiver unit for wireless operation and an antenna arranged in the circumferential trench.

8. The earpiece according to claim 7, wherein the transmitter/receiver unit has an operational frequency from 2.4 GHz to 2.5 GHz.

9. The earpiece according to claim 7, wherein the antenna is configured as a dipole antenna.

10. The earpiece according to claim 7, wherein the antenna is configured as a conductive path on a flexible printed circuit board.

11. The earpiece according to claim 6, wherein the circumferential wall is positioned to directly adjoin the shell when the shell is glued on the cover plate.

12. The earpiece according to claim 6, wherein a radially inwardly facing, circumferential recess is provided at the lateral end of the shell, the circumferential recess being designed such that the circumferential wall is at least partially received therein and that a remaining part of the lateral end of the shell is glued on the cover plate.

13. The earpiece according to claim 6, wherein the shell is made of one of titanium, plastic, and an elastomer.

14. A method of producing an earpiece, the method comprising:
providing a cover plate comprising a circumferential trench for receiving an antenna on a medial side of the cover plate, wherein the cover plate comprises a circumferential wall radially outward from the circumferential trench, the circumferential wall fully surrounds the circumferential trench and is configured to prevent glue from entering the circumferential trench, and adjacent to the circumferential wall is a surface for gluing a shell on;
arranging at least one internal component on a medial side of the cover plate;
arranging an antenna in the circumferential trench; and
gluing a lateral end of the shell at least upon a medial surface of the cover plate outwardly from the circumferential wall.

15. The method according to claim 14, wherein subsequent to gluing on the shell, a projecting area of the cover plate is cut off along an outer edge of the shell.

16. The method according to claim 14, wherein the shell is produced by 3D printing.

17. The method according to claim 16, wherein a recess is formed in the shell during the 3D printing.

18. The method according to claim 16, wherein a recess is subsequently milled out of the shell.

* * * * *